Dec. 20, 1960 J. C. LANG 2,964,751
METHOD OF DRIVING STAPLES
Filed July 30, 1958 7 Sheets-Sheet 1

INVENTOR.
Joseph C Lang
BY
Christy, Parmelee &
Strickland
HIS ATTORNEYS

Dec. 20, 1960 J. C. LANG 2,964,751
METHOD OF DRIVING STAPLES
Filed July 30, 1958 7 Sheets-Sheet 5

INVENTOR.
Joseph C. Lang
BY
Christy, Parmelee &
Strickland
HIS ATTORNEYS

Dec. 20, 1960  J. C. LANG  2,964,751
METHOD OF DRIVING STAPLES

Filed July 30, 1958  7 Sheets-Sheet 6

INVENTOR.
JOSEPH C. LANG.
BY
ATTORNEYS.

United States Patent Office 2,964,751
Patented Dec. 20, 1960

2,964,751

METHOD OF DRIVING STAPLES

Joseph C. Lang, Pittsburgh, Pa., assignor to Bocjl Corporation, Pittsburgh, Pa., a corporation of Delaware Filed July 30, 1958, Ser. No. 751,905

7 Claims. (Cl. 1—74)

This invention is for a method of driving staples where the legs of the staple are to be turned or clinched in the material during the operation of driving the staple. It has particular application to the closing of boxes where staples are driven into overlapping flaps of the box or carton and clinched in the undermost flap without the use of an anvil for turning the legs.

In my application Serial No. 545,929, filed November 9, 1955, now Patent No. 2,845,626, issued August 5, 1958, of which this application is a continuation-in-part, I have shown a machine for accomplishing said method, and in the present application said machine is completely described. It is there shown as being applicable to a staple having legs which lie in planes oblique to the length of the bridge of the staple, but the same apparatus, so far as the clinching of the staple is concerned, may be used also with conventional staples. However other forms of mechanisms may also be used.

Many attempts have heretofore been made to clinch staples in the manner above described, but they do not give consistently good results. Some staples may be perfectly clinched, while others will be prematurely clinched and will not hold the flaps of the box together, while still others may penetrate the underneath flap and be inadequately turned, or possibly present a hazard to the contents of the box.

I have determined that in driving staples to effect clinching without an anvil, clinching can be better controlled and be more consistently uniform if the legs of the staple penetrate the material into which they are being driven a short distance in the usual manner and then exert a pressure against them to induce curling.

The present invention has for its primary object to secure uniform control of the bending of the legs of a staple by exerting a force to effect a change in their course of travel only after the legs have penetrated the material perpendicularly for a predetermined distance. As shown in the accompanying drawings, this may be accomplished in several different types of mechanism.

In the drawings:

Fig. 38 is a schematic fragmentary section in the plane of line XXXVIII—XXXVIII of Fig. 36;

Since the apparatus illustrated in Figs. 7 to 17 inclusive is here illustrated for the purpose of driving a staple having oblique legs, its operation may be best understood by reference first to Figs. 1 to 6, illustrating the special staple and staple strip.

Figures 1, 2, 3, 4, 5, 6:
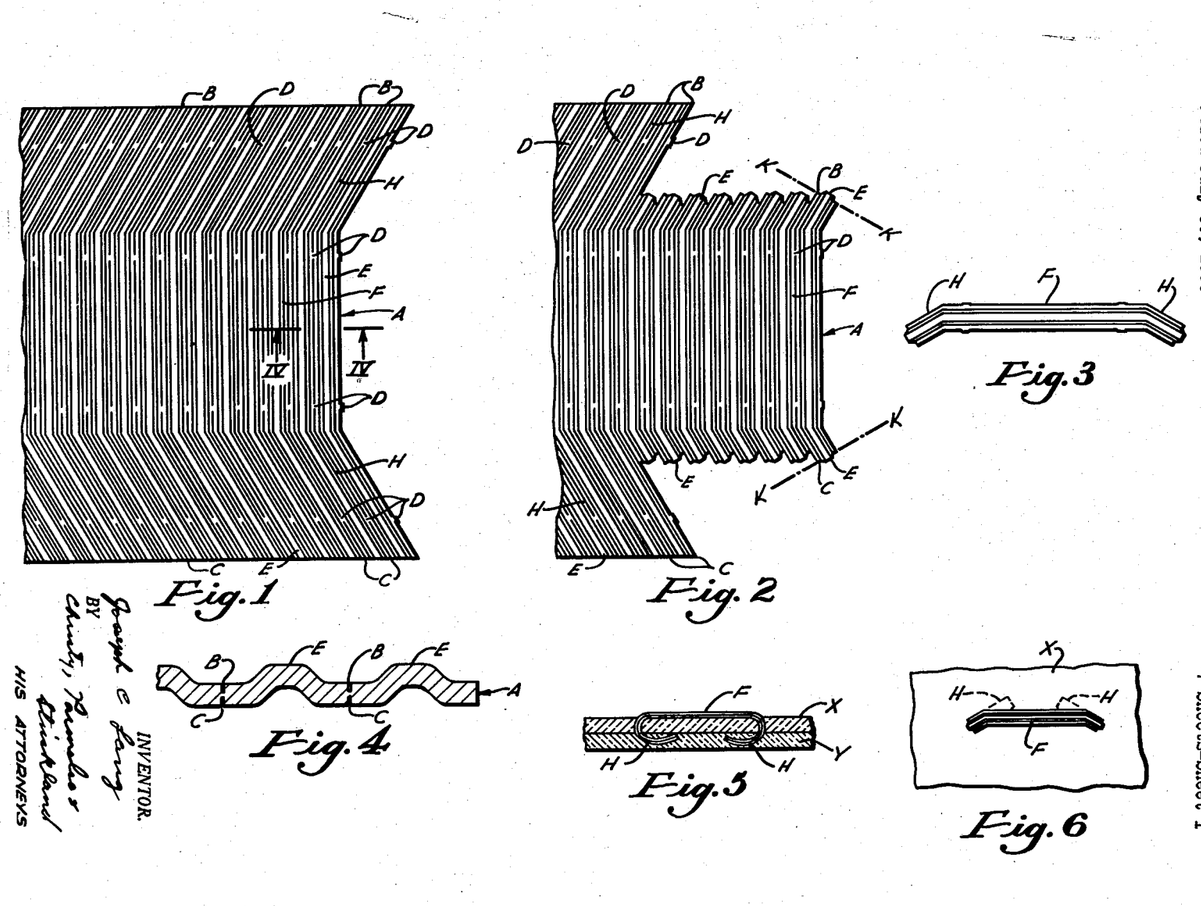
Fig. 1 is a plan view on an enlarged scale of a prepared fastener strip designed for use in the driver constituting the present invention.
Fig. 2 is a similar view of the same strip after the leading end has entered the driver and been operated upon.
Fig. 3 is a top plan view of the finished staple as it transiently exists before driving.
Fig. 4 is an enlarged transverse section in the plane of line IV—IV of Fig. 1.
Fig. 5 is a vertical section on a normal scale showing the driven staple joining two overlying layers of boxboard.
Fig. 6 is a top plan view of Fig. 5.

In Fig. 1 I have shown a short length of a strip of connected fastener blanks before any engagement thereof by the driver at all. This strip A is made from a ribbon of flat metal that is first sheared along the parallel lines B—C, the shearing severing or fracturing the metal along cleavage lines indicated in Fig. 4. The lines B—C are not continuous, but are interrupted at intervals D so that the blanks remain firmly connected. After shearing, the metal constituting a staple blank between each two lines B—C is embossed as indicated at E (best seen in Fig. 4)

to form a ridge along the full top of the blank. As seen from the drawings, and as more fully explained in my application Serial No. 377,457, filed August 31, 1953, the strip has a central area F (see Fig. 1), in which the lines B—C extend transversely and margin portions H in each of which the lines B—C extend angularly to the longitudinal axis of the strip from which the blank is severed and formed; the parts H are the leg-forming portions of the blank, while the part F (and the innermost ends of H) constitute the bridge or top of the staple.

In the operation of the machine to be hereinafter described, the strip of metal thus formed into a succession of blanks is unrolled from a magazine, and advanced, one blank at a time through the machine by an indexed feeding mechanism that engages the ridges or corrugations of the strip. At the first stage in the operation of driving, the leg-forming elements H are successively bent downwardly on a bend line K—K (Fig. 2) that is at right angles to the length of the portions H and oblique to the bridge-forming elements F. The leg portions are thus turned down to staple form, but instead of being in parallel planes transverse to the axis of the bridge as with conventional staples, they are in planes which converge forwardly (toward the right) as viewed in Fig. 2, the lines K showing the planes in which the legs would lie. During this bending the parts D connecting the leg elements will be sheared, but the parts D connecting the bridge portions of successive blanks are not severed.

When the blank with the legs bent down has progressed a distance of several blanks, eight steps being shown in Fig. 2 (during which time the seven succeeding blanks will also have had their legs turned down in like manner) the blank will be completely sheared from the leading end of the strip and driven.

As it is driven the staple legs will be guided and confined by elements that tend to curl the legs, so that as they penetrate the substance into which they are driven, they are caused to curl or assume a clinched position with the cardboard. This is shown in Figs. 5 and 6 illustrating the finished staple in driven condition and the operation is diagrammed in Fig. 12. In Figs. 5 and 6 X and Y are lapped flaps of a box or carton. The top flap X is the one against which the staple is first driven, and as the driving progresses, the legs fold or curve before they pass through flap Y, thus firmly joining the flaps and requiring in most instances the tearing of the material in order to open the carton. This holding power, as is evident from Fig. 6, is increased because of the angular disposition of the legs of the staple which have their terminals converging but projecting away from the bridge of the staple. This condition is especially good with corrugated box-board because one of the legs must nearly always be diagonal to the corrugation.

*Blank feeding*

Coming now to the method and machine itself, the machine comprises a base block 2 formed in two parts. This base provides an area on which the strip A is supported. At each side of the face are upwardly-extending side plates 3 and a shaft 4 (see Fig. 10) extends across between the plates at a distance above the plane of the strip. The shaft provides a pivotal support for bell-crank members 5 having a downwardly-extending arm 6 and a rearwardly-projecting arm 7.

Figure 9:
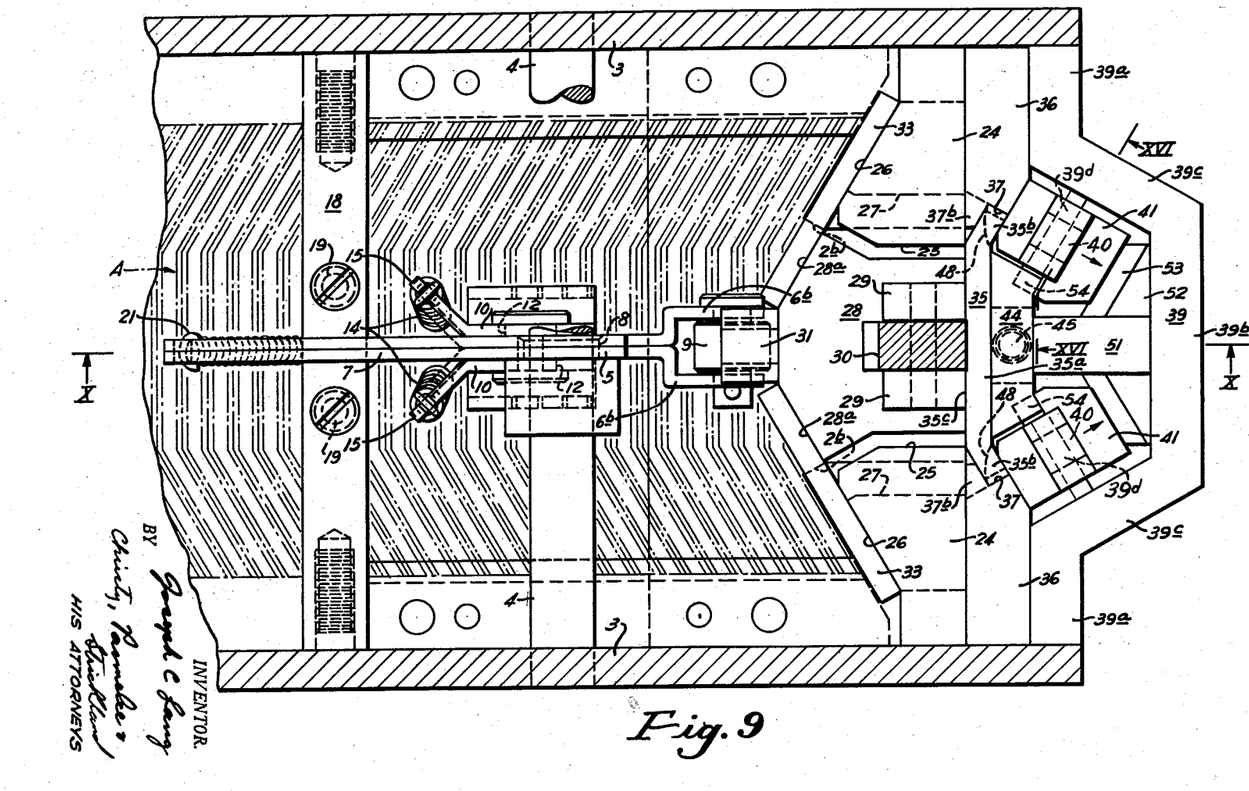
Fig. 9 is a section on a larger scale in substantially the plane of line IX—IX of Fig. 7, parts being omitted for purposes of illustration.

As best seen in Fig. 9, the bell crank is made of two sheet metal stampings placed face-to-face with a bushing at 8 to fit on the shaft 4.

The depending arm 6 has a forward extension 6a, the two plates forming this nose having spaced terminal portions 6b (Fig. 9) between which is a cam roller 9. Embraced by the two plates forming the vertical arm of the bell crank is a slide plate 10 formed of two like sheet metal stampings, there being fixed pins 11 in the arm 6, on which are rollers 12 engaging in vertically elongated slots 13 in the double slide plate 10 so that it may freely move up and down a limited distance. Two like springs 14, each attached at one end to a lug 15 on the slide plate and with its other end to a lug 16 on the lower end of the crank arm 6 resiliently urge the slide plate downwardly. The lower ends of the two plates 10 which function in unison as a single plate, have a series of ratchet-like teeth 17 at the bottom thereof, the spacing of the teeth conforming to the spacing of the valleys of the strip of blanks. These teeth have their forward (right as viewed in Fig. 10) faces vertical and their opposite faces sloped.

There is a crossbar 18 extending between the plates 3 rearwardly of the shaft 4 and at a lower level. It has a pair of spring biased pin elements 19 therein, the terminals of which press down on the strip A. Bell crank arm 6 has a rearward extension 20 (Fig. 9) that overhangs this crossbar. This limits the downward or counterclockwise rocking movement of the bell crank. A spring 21 has one end connected to an eye 22 on the crossbar, and its other end connected to the rearwardly-extending arm 7 of the bell crank and creates a force tending to rock the bell crank in a counterclockwise direction.

Figure 10:
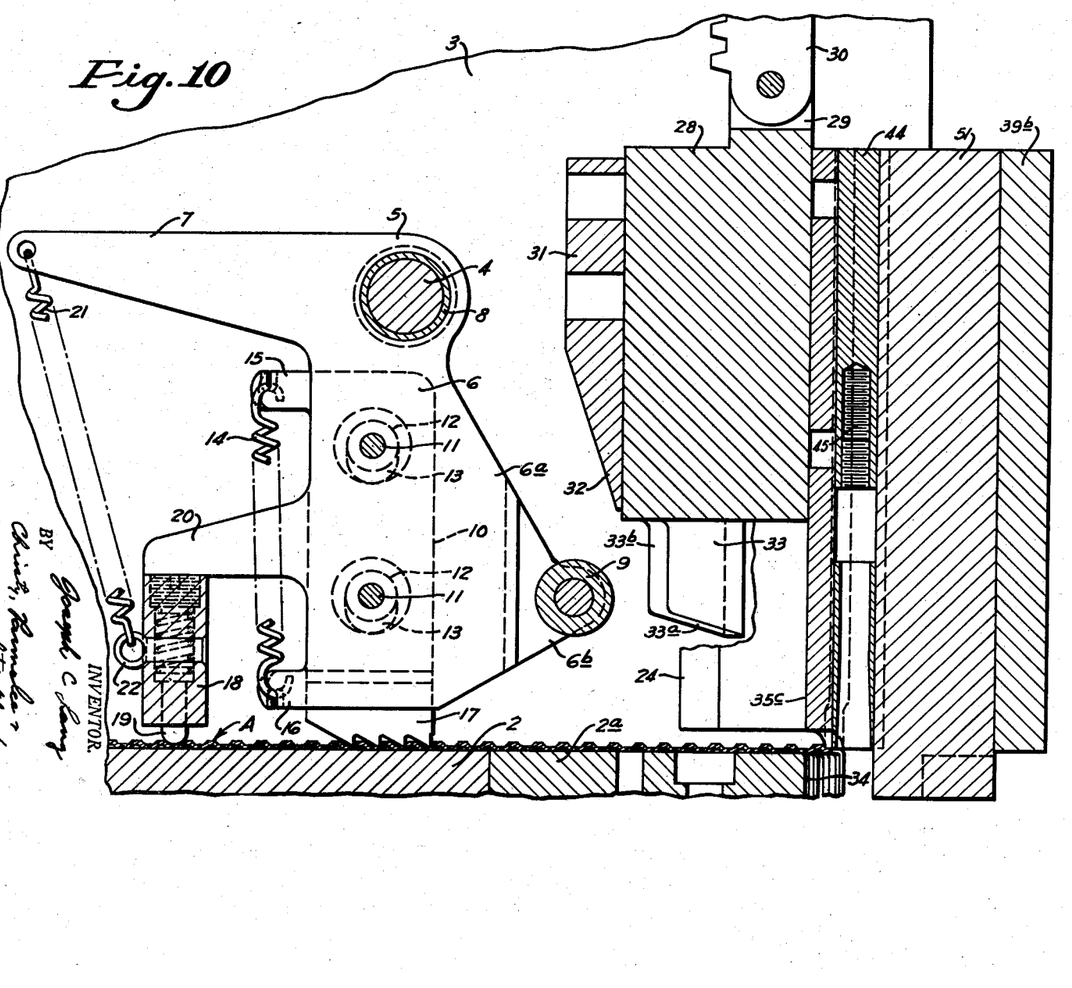
Fig. 10 is a vertical section in approximately the plane of line X—X of Fig. 9.
Figure 11:
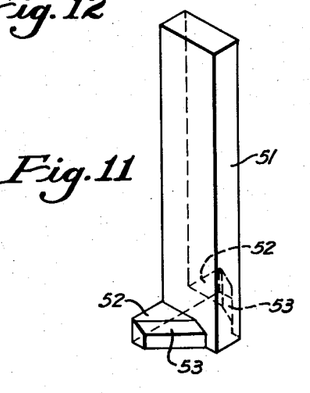
Fig. 11 is a perspective view of the back-up element which cooperates with the two die blocks that effect curling of the legs.

When the machine is operated in the manner to be subsequently described, a cam face 32 engages roller 9 and moves the bell crank assembly in a clockwise direction about shaft 4 as viewed in Fig. 10. During this movement the teeth 17 of the slide plate 10 ride back over the strip A while the spring detent pins 19 hold the strip itself from rearward movement. On the return stroke, when cam 32 clears roller 9, the spring 21 operates to return the bell crank to the position shown in Fig. 10, and in so moving the bell crank, the ratchet teeth 17 catch in the ribs E of the strip A and slide the strip forward one notch, i.e., the distance of one blank.

Figures 7, 8:
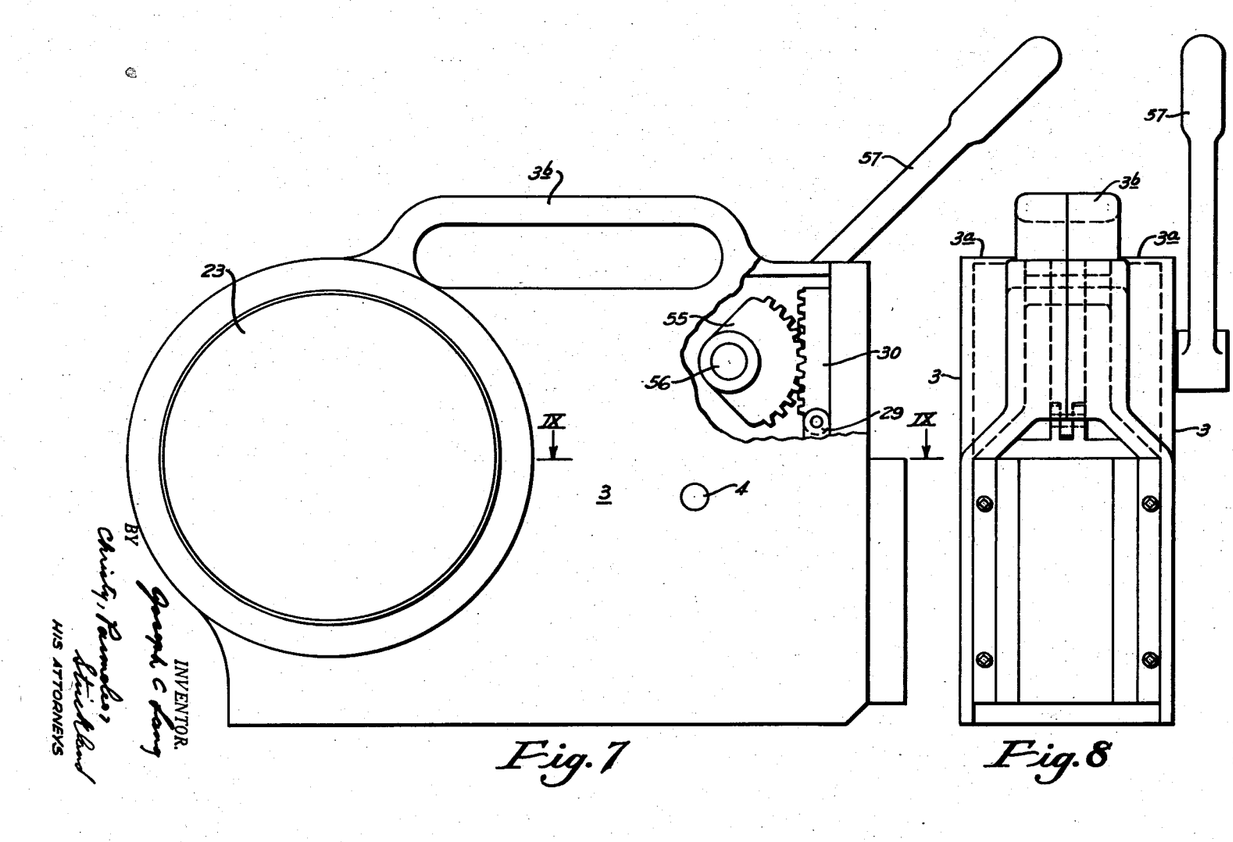
Fig. 7 is a side elevation of a complete machine embodying my invention.
Fig. 8 is a front elevation of the machine shown in Fig. 7.

As shown in Fig. 7, the side plates 3 rearwardly of the feeding mechanism, provide between them a circular chamber 23 into which a coil of strip can be placed, and from which the end may be "threaded" under the feeder, the feeder permitting the pushing of the end of the strip forwardly, but preventing any retracting movement of it. The side plates have inwardly-turned top flanges 3a (Fig. 8) forming a top closure, and on these are provided matching handle portions 3b (Fig. 7) which are provided for a portable machine. For a fixed box closing machine a different form of housing is provided.

*Leg bending*

Between the side plates forwardly of the feeding mechanism are two spaced uprights or stanchions 24 (see Figs. 9 and 10) which have parallel confronting faces 25 and outwardly divergent rear faces 26. These uprights are undercut as indicated by the dotted lines 27 in Fig. 9, the arrangement being such that the ends of the wide strip before the legs are bent downwardly (see for example Fig. 2) will hit the faces 26 and prevent further forward travel, but when the leg portions are bent down they will be clear of the faces 26 and ride along through the undercut to the point of final shearing.

Guided between the stanchions 24 is an operating head or block 28 having ears 29 thereon to which is pivotally attached a rack 30 (see Fig. 10) by means of which the block is raised and lowered. On the rear of this block there is secured a nose piece or cam 31 having a tapered lower end 32 and this overhangs the cam roller 9, so that when the block, constituting part of the driver assembly is moved down, the roller 9 is engaged to retract the feeder, and which then allows the feeder to move forward when the head or block rises. The forward feed of the strip is thus effected and is restricted by the surfaces 26.

The block itself has two wing-like punch or die elements 33 secured to divergent side faces 28a thereof, and which bear against the surfaces 26 of the stanchions. These wing-like die elements, as shown in Fig. 10, project below the block 23 and have inclined bottom surfaces 33a that are lowest at their outer ends and vertical surfaces 33b.

The base block 2 is flat, but at its forward end it has a step with a portion at a lower level on which is a flat narrow strip 2a forming a ridge which the wing-like die elements straddle as the head 28 moves down. This ridge has a portion at each side which flares, providing angular surfaces 2b over which the bending of the legs takes place. The wing elements engage the leg sections of the endmost unbent blank on the strip on each downward stroke of the head or plunger block 28 and bend the legs down as shown in Fig. 2. The portion of the strip with the bent-down legs then rides along the flat ridge-like portion 2a to the point of final severance.

*Driving the fastener*

On the forward face of the plunger or head 28 is the cut-off and driving die, designated generally as 35. It has a flat portion 35a that is against the front face of the head, and it has an angularly projecting wing 35b along each edge. The ridge-like piece 2a terminates at 34 at the plane of the inner face of the die plate 36 so that as this inner face, designated 35c in Fig. 9 rides down past the end of the ridge 34, the single projecting fastener blank will be sheared off. The bottom edge of the plate 35 will exert pressure on the top or bridge of the staple, while the bottom faces of the wings 35b will be over and exert downward pressure on the angular end portions H of the staple blank that form part of the bridge.

Secured to the forward face of each of the uprights or stanchions 24 is a guide 36, these guides 36 extending down flush with the bottom face of the base. These two guide plates extend up along each side of the die plate 35 and have angular faces 37 on which the edges of the wing elements 35b ride and are guided. They also have triangular flanges 37b that fit behind the wings. At the level where the staples are projected under the cut-off and driving die 35 these triangular flanges 77 are cut away so that the legs of the staple may be pushed under the wings 35b. Below this level the triangular flanges 37b in conjunction with the surfaces 37 form two faces of a guide down which the legs of the staple slide as the staple is driven. At the very bottom of each guide is an inwardly-turned tip or die 36d. This may be best seen in Fig. 12.

Extending forwardly from the guide elements 36 is a bridge plate 39, which as viewed in Fig. 9 is of arch form, having pad portions 39a that abut against the guides 36 and which are secured thereto. It has an intermediate offset portion 39b with angular connection portions 39c.

Figure 16:
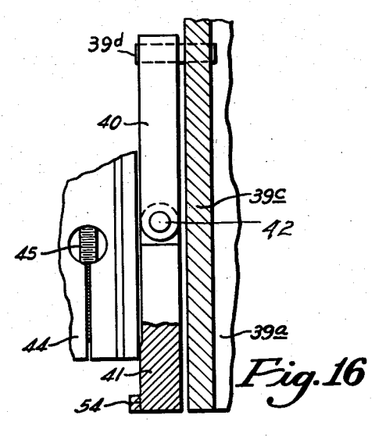
Fig. 16 is a vertical section in the plane of line XVI—XVI of Fig. 9 showing the pressure blocks and pivotal links (omitted from Fig. 9) from which the blocks are hung for movement in two directions.
Figure 18:
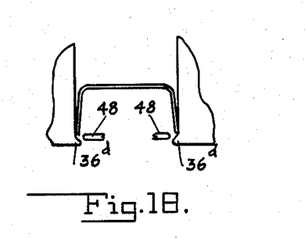
Figs. 18 to 21 are schematic views showing progressive stages in the operation of driving the staple.
Figure 19:
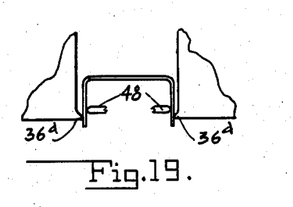
Figure 20:
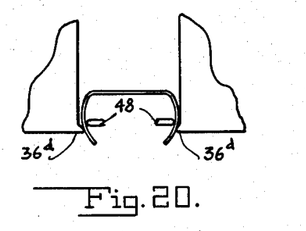

Each of the angular connecting portions 39c has a horizontal pivot pin 39d projecting inwardly toward the driver 35 (see Figs. 9 and 16). Hung from each of these pins so as to pivot in one plane are links 40. A pressure block 41 is pivotally hung at 42 from each link to pivot at right angles to the direction in which the links 40 pivot, so that the blocks 41 are universally movable in any direction transverse to their vertical axes, but held against any significant vertical movement.

Figure 12:
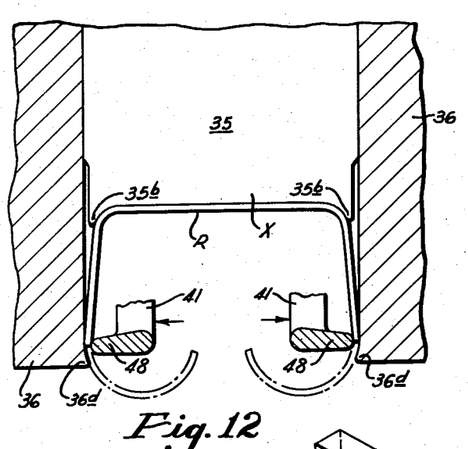
Fig. 12 is a distorted schematic view illustrating the relation of the leg curling elements to the guide, the view representing the parts in the plane which they would occupy if the staple were a conventional flat staple.
Figures 13, 17:
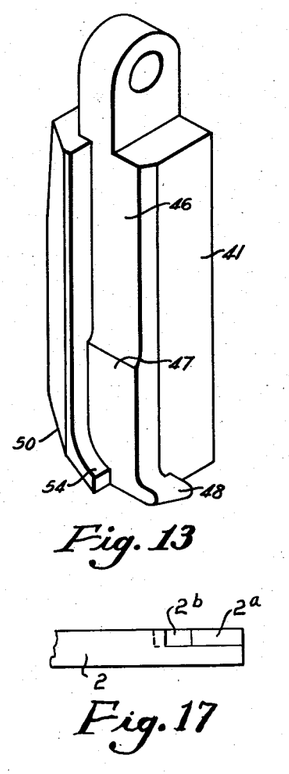
Fig. 13 is an enlarged perspective view of one of the two die or pressure blocks.
Fig. 17 is a fragmentary side elevation on a smaller scale of the forward end of the base removed from the machine.
Figure 14:
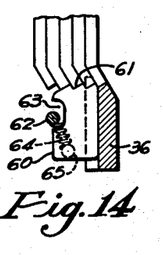
Fig. 14 is a fragmentary view in horizontal section showing means for preventing the staple when being sheared from cocking rearwardly.
Figure 15:
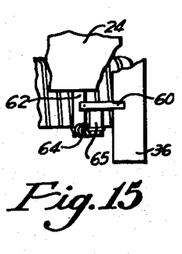
Fig. 15 is a fragmentary sectional view in vertical section of the parts shown in Fig. 14.

Secured to the front face of the driver 35 is a cam plate 44 that also moves up and down with the plunger 28 and driver 35, and relative to the blocks 41. It has a tapered head screw 45 entered into its lower end, its lower end being split vertically, so that by turning the screw one may adjust within close limits the effective width of the member 44. The cam plate 44 has oblique side faces that confront flat surfaces 46 on the pressure blocks 41. As shown in Figs. 12 and 13 each surface 46 has a riser at 47 so that as the cam plate 44 moves down between these risers, the pressure blocks 41 will be urged outwardly away from the longitudinal center of the machine. The blocks 41 have offset tip elements 48 at their lower ends, these tips being located in a plane slightly above the die tips 36d. The downward movement of the cam plate operating against the risers 47 tends to move these tips outward, whereby, shortly after the driving operation is started, pressure will be exerted by the tips 48 against the inner faces of the legs of the fastener. This pressure, in conjunction with the convexed die tips 36d, causes the staple legs to curl, and the disposition of the risers on the pressure blocks is such that the curling starts only after the legs of the fastener have entered the top surface of the material into which the fastener is being driven. In other words there is some predetermined downward movement of the fastener before the pressure blocks move in a diagonal direction relative to the long axis of the machine, this movement being in a direction normal to or at right angles to the flat inner faces of the fastener legs and to the guide channels in which the legs are guided. In Fig. 12 for clearness of illustration it is shown as a transverse movement. It is because the staple legs are turned at an angle and the pressure blocks actually move in a diagonal direction that the blocks are pivoted for movement in two planes. During driving the legs of the staple are confined in the guide formed in the guide members 36 with their angular faces 37 and parts 37b and also guided by the faces of the blocks 41, channels for the legs being thus provided.

The lower ends of the blocks 41 have a rounded heel 50. On the front face of the cam plate 44 is a bar 51 with a cross part 52 at its lower end, this cross part having beveled surfaces 53 on the faces which confront the blocks 41.

During the downward stroke of the plunger the cross part 52 rides down the outer faces of the blocks 41, forming a back-up cam which keeps the blocks from being forced forwardly, i.e., diagonally to the right as viewed in Fig. 9. Near the end of the downward stroke, the beveled surfaces 53 ride past the rounded heels 50 on the blocks, providing clearance so that the blocks may then swing in the direction of the arrows in Fig. 9. At this same time the end of the cam plate 44 at the front of the driver will engage rounded cam surfaces 54 on the lower ends of the pressure blocks and positively move the blocks in the direction of the arrows, thus withdrawing the die tips 48 on the blocks from the path of travel of the bridge of the fastener and the bottom end of the driver. In so doing these tips cannot be broken off or interfere with the fastener being driven fully "home" with its bridge tight against the top surface of the material into which the fastener is driven.

On the up-stroke of the driver, there is no fastener in the guides, so that all of the parts have free working clearance and the plunger can be easily retracted.

The plunger is here shown as being operated by means of a toothed quadrant 55 on a rock shaft 56 supported by the side plates 3. The pinion meshes with the teeth on the rack 30 and the rock shaft has an operating lever 57, but any other suitable mechanism may be used, depending upon whether the machine is designed as a portable unit, as shown, or is a fixed box closing machine with power operation (see Fig. 7).

In Fig. 12 I have shown schematically the driving of the fastener, the parts being transposed to the plane they would occupy if the staple were a conventional staple instead of one in which the fasteners have obliquely disposed legs. In this view, the fastener, designated R, is in position under the driver X in position to be driven. It will be noted that the legs, instead of being absolutely vertical, diverge downwardly to a slight angle and there is a noticeable arc joining the legs to the bridge, the arc being on a radius which is appreciable. This is important, because the bridge of the staple must pass between guide tips 36d.

The lower end of the driver X is contoured as shown to conform to the contour of the fastener and is actually grooved at the bottom to accept the embossed rib (E in Fig. 4) of the fastener. The guides are marked 36, and the guide tips 36d are shown at the exact correct radius. The tips 48 of the pressure blocks 41 are only schematically illustrated but in their exact contour and relation to the die tips.

Figure 21:
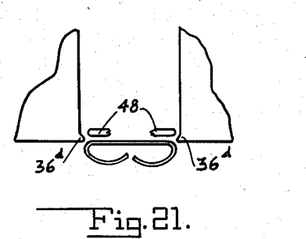

Referring to Fig. 12 and schematic views Figs. 18 to 21 inclusive, it will be noted that as here shown, the legs of the staple are normally spread slightly and the width of the space between the guide tips 36d is just sufficient for the bridge of the staple to pass through. With the initial downward travel of the plunger X, the legs are cammed or forced into parallelism, passing as they do between the tips 36d and the element 48. The legs of the staple then are in the position shown in Fig. 19, having projected an appreciable distance beyond the end of the driver guide and entered the material into which they are being driven. As the driver continues its downward movement, pressure is exerted on elements 48 to move them laterally, as indicated by the arrows in Fig. 12. This spreads the legs of the staple laterally into contact with the sides of the guides above the guide tips 36d, tending to bow them to the position shown in Fig. 20 and definitely turn the projecting ends of the staple legs toward each other. This pressure is maintained until the bridge of the staple is just about to contact the elements 48, and the pressure so maintained causes the legs to curl in a controlled pattern. At this position of the driver pressure on the elements 48 is relieved and the blocks 41 swing inwardly and backwardly out of the path of travel of the staple bridge and driver and the final flattening down of the staple takes place, as indicated in Fig. 21. The staple legs curl in the same degree because both are always subjected to equal or balanced forming pressure since the cam plate 44 is pivotally supported and thus cams the two die tips 48 against the staple legs with equal contact force.

While the foregoing action is described in connection with the staple having oblique legs, the same method may be used for conventional staples, as will be hereinafter pointed out.

*Resume of operation*

The machine is first set down on the surface into which the fastener is to be driven. The operator may hold the machine with his left hand, moving the operating lever 57 in a clockwise direction with his right. This moves the whole plunger assembly down and the legs on one blank are bent down into driving position while the endmost blank, eight stations forwardly, and which is under the driver, is sheared off and driven down. As it is being driven down, the pressure blocks 41 are forced outwardly by the cam plate 44 engaging risers 47 on the blocks, so that the parts 48 press against the inner faces of the staple legs while the blocks are kept tight by the back-up cam 52. As the driver moves down, the cam 32 moves the feeder 17 rearwardly and "cocks" it. Just before the driving stroke is completed, the back-up cam 52 contacts the rounded edges or heels 50 of the blocks 41 allowing clearance for the blocks to kick diagonally forward, and the end of the member 44, riding down the curved cam surfaces 54 on the lower ends of the blocks 41 pushes the blocks to a position where die parts 48 are clear of the space under the bridge of the staple, and the staple is driven home.

The operator then raises the handle, restoring the parts to starting position, and effecting the feed of the next blank to a position under the driver.

The machine thus provides a compact driver, capable of curling or clinching the fasteners and driving the fasteners down tight against the material into which the fastener is driven. The machine prepares one blank for driving while driving another. The leg-curling means, after operating, is automatically retracted from under the fastener. The machine is additionally unique in that it operates on oblique staples, as described.

In the operation of the machine, the foremost staple of the strip is unsupported at the time it is sheared off. This sometimes results in the top of the staple bending down under the pressure of the driver, tilting the legs backwardly so that they do not line up with the staple guide. This can be overcome by anti-tilting means shown in Figs. 14 and 15 where the piece 36 has a horizontal slot milled therein in which is slidably received a transversely movable plate 60 having a series of ratchet-like teeth 61 at its inner end that conform to the angle faces of the staple legs. This plate is at a level where the teeth 61 engage the staple legs near their lower ends. A screw 62 in the under surface of stanchion 24 engages in a notch 63 in the plate 60 to allow this plate to move laterally a limited distance. A spring 64 attached to this screw and to a post 65 on the underside of the plate 60 urges the teeth 61 toward the staples. When shearing pressure is applied to the staple at the left end of Fig. 15 the front tooth 61 keeps the leg from swinging back. When the strip of staples feeds forward, plate 60 is simply cammed back against the pull of the spring and then snaps into engagement with the staple legs when they come to rest.

There are of course two of these ratchet plates, one at each side. Their use is desirable but not necessary, and for clarity of illustration they are not shown in Fig. 9.

Figure 22:
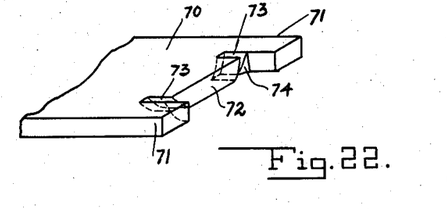

In the method shown in Fig. 22 and in Figs. 23 to 30, there is a slide plate or mask 70 that forms the bottom of the staple driving guide. It is organized mechanically much like the driver shown in my former patent No. 2,440,479, granted April 27, 1948. This plate or mask has two forwardly-projecting extensions 71, one at each side of the plate 70, and the space between them is open, it being the width of the bridge of the staple. Inwardly from these two extensions, the plate has a central tongue 72 separated from the body of the plate at each side by inwardly-curved slots 73, there being a transition area 74 between the vertical inner faces of the extensions 71 and these curved slots, so that, but for the curvature, the outer wall of each slot constitutes a continuation of the inner face of the extension 71.

Figure 23:
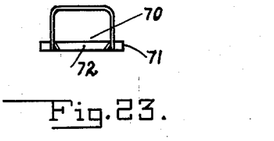
Figs. 23, 25, 27 and 29 are schematic views showing progressive stages of the method utilizing the apparatus of Fig. 22 looking endwise into the apparatus.
Figure 24:
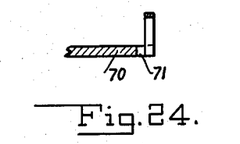
Figs. 24, 26, 28 and 30 are corresponding schematic views in longitudinal section of the parts shown in Figs. 23, 25, 27 and 29 respectively.
Figures 25, 26:
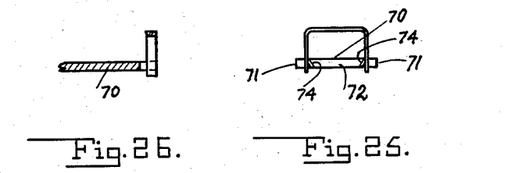
Figure 27:
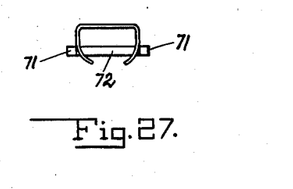
Figure 28:
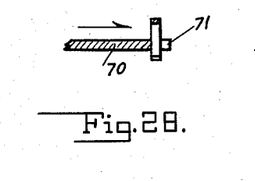
Figures 29, 30:
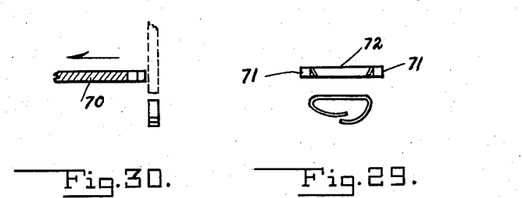
Figure 31:
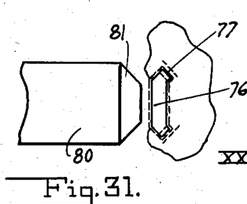
Figs. 31 and 32 are schematic top and side elevations of another form of apparatus applicable only for the driving of oblique leg staples.

As will be seen by reference to Figs. 23 and 24, the plate 70 is in a position where the legs of the staple are guided on the outside by the inner faces of the extensions 71 at the start of the driving operation. This condition prevails, as shown in Figs. 25 and 26, until the legs of the staple project well below the plane of the bottom of the plate 70, being then entered into the top surface of the material into which the staple is being driven. Then plate 70 is slid to the right as viewed in Fig. 28, and as the staple legs ride over the transition areas 74 into the curved slots, the projecting legs are turned toward each other as shown in Fig. 27. Plate 70 remains in this positon until just before the bridge of the staple will be driven against it, when it will be pulled to the left as shown in Fig. 30 to the position shown in Fig. 24, and the bridge of the staple and the driver (not shown) will pass down between extensions 71 to finally set the staple.

Figures 32, 33, 34, 35, 37, 39, 40:
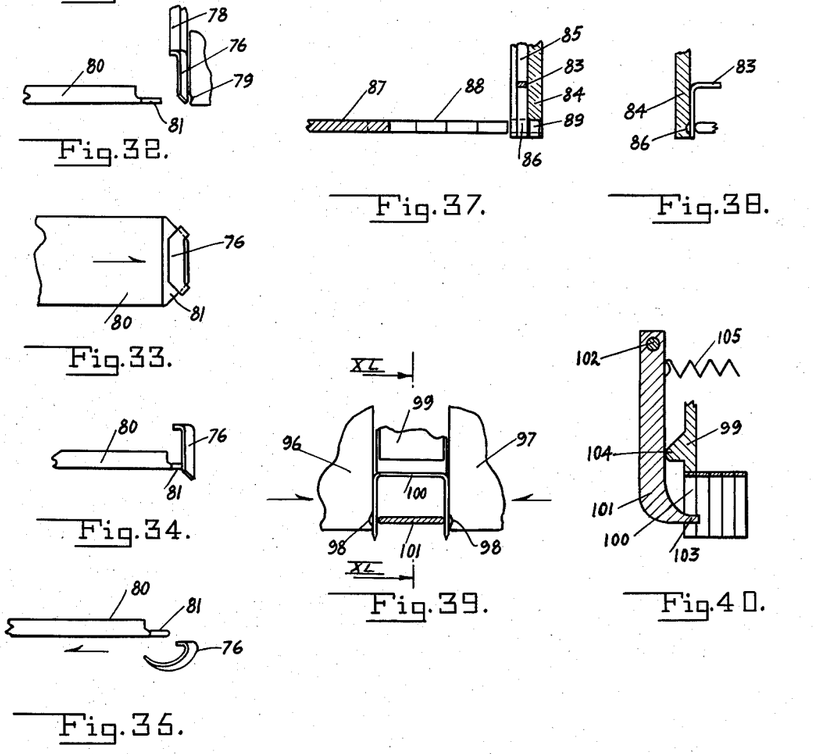
Fig. 33 is a view similar to Fig. 27 showing a second stage in the operation of driving.
Fig. 34 is a schematic side elevation of Fig. 33.
Fig. 35 is a view similar to Fig. 29 of the final step of driving with this apparatus.
Fig. 37 is a schematic section in the plane of line XXXVII—XXXVII of Fig. 36.
Fig. 39 is a schematic front elevation of still another apparatus for accomplishing my method.
Fig. 40 is a section in the plane of line XL—XL of Fig. 39.

In the apparatus disclosed in Figs. 31 to 35, the staple 76 is one having the legs oblique to the longitudinal axis of the bridge. It is received in a staple guide 77 down which a driver 78 moves. As shown in Fig. 32, the guide is recessed just above its lower end, the recess being indicated at 79. At the base of the stapling machine there is a slide plate 80 that slides back and forth with respect to the guide. It has a lip 81 at its forward end, and the ends of the extension are cut off at the angle of the staple legs. When the staple has been partly driven, as for example through the uppermost of two box flaps, (see Fig. 34) the plate 80 moves forward as indicated by the arrow in Fig. 33, applying pressure to the legs at the point where they span the recess 79. This imparts a camber to the legs, turning them toward each other. The plate 80 remains in this position as the driving continues, creating a continuing pressure against the legs until just before the driver reaches the lip 81 when the plate withdraws as indicated in Fig. 35, and the driving of the staple is completed.

Figure 36:
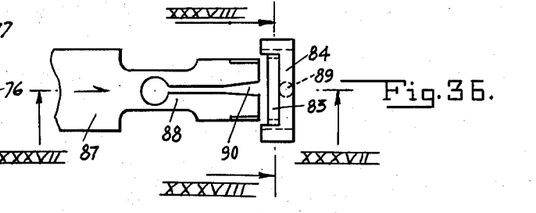
Fig. 36 is a fragmentary top plan view of still another form of apparatus.

The apparatus outlined in Figs. 36 to 38 also makes use of a sliding plate to exert a turning pressure against the legs. In this case the staple is a conventional staple or stitch and it is designated 83. It is moved down the guide 84 by a driver 85. The sides of the guides each have a recess 86 (see Fig. 38) therein just upwardly from the bottom of the guide. There is a reciprocating plate 87 movable horizontally in the plane of the recess 86. It has a bifurcated forward end portion 88. A spreader pin 89 is located at the bottom of the staple guide, so arranged that when the plate is moved forward the pin will enter the bifurcation 90 and spread the two ends of the plate laterally to apply pressure to the legs where they traverse the recesses 86. This occurs after the staple has been partly driven, as previously described, and the plate remains in this position until just before the bridge of the staple would contact it, when it is withdrawn, and the driving completed.

In the modification shown in Figs. 39 and 40 the staple guide is formed of two confronting members 96 and 97 which are supported for slight movement toward and away from each other. The confronting faces of these members provide a conventional guide for a U-shaped fastener, except that just above the bottom each guide has a recess 98 therein. The driver 99 moves vertically between the guides and the staple, indicated at 100. In Fig. 39 the staple is shown in a partly driven position, where the staple points are partly projected. There is a former 101 that is here shown as being hung from a pivot 102. It has an offset end 103 that normally projects into the staple guide to bear against the inner faces of the legs of the staple 100, as shown in Fig. 39, this offset portion 103 being in the plane of recesses 98. The driver 99 has a cam 104 that bears against the face of the former 101, and a spring 105 that moves the former into positon.

When the staple has been partly driven, the guide members 96 and 97 are moved toward each other as indicated by the arrows in Fig. 39, causing the legs of the staple to be squeezed against the portion 103 of the former and bent into the recesses 98, and this pressure against the legs continues to be exerted during the succeeding portion of the driving until just before the driver and bridge of the staple would strike the part 103 of the former, when cam 104 engaging the rounded surface where 103 joins 101 pushes the former to the left as viewed in Fig. 40 out of the path of the staple and driver.

For simplicity of illustration of the several methods, only so much of the mechanism has been indicated as may be necessary to enable one skilled in the art to practice the invention. It is common in the stapling or stitching art to correlate the horizontal movement of a former to the movement of a driver, and such mechanisms constitute no part of the method.

In all of the procedures herein described, the initial driving of the staple is conventional, in that the legs penetrate the material in a direction normal to the surface of the material for a predetermined distance which is usually, in the case of a carton, about the thickness of one flap or slightly less. Only after that is pressure applied against the inner faces of the staple legs to force or bow them outwardly, tending to deflect the legs in a direction toward each other. Thus accurate control is secured of level of penetration at which turning or curling of the legs occurs. This curling or bending pressure is then maintained until the driving is nearly complete, when the inner ends of the staple will have been deflected to an extent where they are moving toward the driver, when the bending pressure is relieved and the staple is set by being driven hard and without further restriction flat against the surface of the material penetrated by the staple. In this final operation the legs of the staple are so confined in the material that they continue in the curved path that was established before curling pressure on the staple legs was removed. It will further be seen that the process may be effected in apparatus of various kinds, several of which have been described.

I claim:

1. The method of driving a staple-like fastener to effect clinching of the fastener in the material into which it is being driven, which comprises starting the penetration of the legs into the material in a straight-through direction and after the legs of the fastener have penetrated the material applying pressure to the inner faces of the legs against a curved guide surface at the exterior of the legs to effect a curling action and terminating such curling action just before the driving is completed.

2. The method of driving a staple-like fastener having initially straight legs into a boxboard carton to effect clinching of the fastener in the material into which it is being driven, which comprises starting the penetration of the legs into the material in a straight-through direction only after the legs of the staple have penetrated the material a predetermined depth then applying to each leg a bending pressure in the direction of the width of the staple and continuing such pressure until the driving of the staple nears completion, the pressure so applied being sufficient to cause the leg to curl in the boxboard material in which it is being driven.

3. The method of driving staples having initially straight legs into cartons and the like formed of boxboard to effect clinching which comprises initially driving the staple with its legs penetrating the boxboard material into which it is driven in a direction normal to the surface of the material until the staple has been partially driven, then only after the legs have penetrated the boxboard material a predetermined distance exerting a bending force on the legs in a direction across the width of the staples and independently of the driving force while continuing the driving and continuing such bending force until the driving is almost complete.

4. The method of driving staples having flat bridge portions and depending substantially parallel legs into cartons and the like to effect clinching which comprises initially driving the staple with its legs penetrating the material into which it is driven in the direction in which they are substantially parallel with each other until the staple has been partially driven, then exerting a bending force on the legs in a direction tending to bow the ends of the legs out of parallelism and continuing such pressure until at least most of the full length of the legs has been driven into the material and relieving said pressure just before the final part of the drive.

5. The method of driving a staple having a bridge and legs at each end of the bridge into overlapping flaps of a carton to effect clinching during driving which comprises driving the staple with the legs normal to the surface they penetrate until a partial penetration of the legs into the material is effected, then engaging each leg between outer and inner contoured surfaces that exert a bending force on the legs, and keeping the legs so confined until the driving has been almost completed.

6. The method of driving a staple having two legs connected by a bridge into a carton or the like which comprises driving the staple in a guide which holds the staple in position and guides the legs, and forcing the legs into the material into which it is to be driven with the legs normal to the surface of the material until a predetermined depth of penetration, then effecting relative movement of the guide and staple legs in a direction transverse to the legs of the staple to exert an outward bending force on the legs intermediate their ends and the bridge, and continuing to exert such force until the staple has been almost completely driven.

7. The method of driving a staple having two legs connected by a bridge into a carton or the like which comprises driving the staple in a guide which holds the staple in position and guides the legs, and forcing the legs into the material into which it is to be driven with the legs normal to the surface of the material until a predetermined depth of penetration, then effecting relative movement of the guide and staple legs in a direction transverse to the legs of the staple to exert an outward bending force on the legs intermediate their ends and the bridge and continuing to exert such force until the staple has been almost completely driven and relieving such force at the final stage of driving the bridge against the surface of the material.

References Cited in the file of this patent

UNITED STATES PATENTS

| | | |
|---|---|---|
| 1,828,067 | Pitcher | Oct. 20, 1931 |
| 1,945,377 | Pasnack | Jan. 30, 1934 |
| 2,008,086 | Sorenson | July 16, 1935 |
| 2,178,354 | Brownstein | Oct. 31, 1939 |
| 2,392,159 | La Place | Jan. 1, 1946 |